United States Patent
Fehr et al.

(10) Patent No.: US 7,489,990 B2
(45) Date of Patent: Feb. 10, 2009

(54) SYSTEMS AND METHODS FOR CALCULATING AND PREDICTING NEAR TERM PRODUCTION COST, INCREMENTAL HEAT RATE, CAPACITY AND EMISSIONS OF ELECTRIC GENERATION POWER PLANTS BASED ON CURRENT OPERATING AND, OPTIONALLY, ATMOSPHERIC CONDITIONS

(76) Inventors: Stephen L. Fehr, 157 Benziger Ave., Staten Island, NY (US) 10301; Linda A. Hutchinson, 411 Captain Eames Cir., Ashland, MA (US) 01721

( * ) Notice: Subject to any disclaimer, the term of this patent is extended or adjusted under 35 U.S.C. 154(b) by 0 days.

(21) Appl. No.: 11/779,139

(22) Filed: Jul. 17, 2007

(65) Prior Publication Data

US 2008/0021675 A1    Jan. 24, 2008

Related U.S. Application Data

(60) Provisional application No. 60/831,389, filed on Jul. 17, 2006.

(51) Int. Cl.
  *G05D 29/00* (2006.01)
  *G21C 17/00* (2006.01)
  *G05B 17/00* (2006.01)
(52) U.S. Cl. .................. 700/291; 700/286; 702/182
(58) Field of Classification Search ............ 700/291, 700/286; 702/60, 61, 182
  See application file for complete search history.

(56) References Cited

U.S. PATENT DOCUMENTS

| | | | |
|---|---|---|---|
| 6,038,540 | A | 3/2000 | Krist et al. |
| 6,230,480 | B1 | 5/2001 | Rollins, III |
| 6,494,045 | B2 | 12/2002 | Rollins, III |
| 6,606,848 | B1 | 8/2003 | Rollins, III |
| 6,745,109 | B2 | 6/2004 | Kojima et al. |

(Continued)

OTHER PUBLICATIONS

Daycock, et al. Generation Cost Forecasting Using On-line Thermodynamic Models' Electric Power 2004, Baltimore, MD. pp. 1-9.*

(Continued)

*Primary Examiner*—Albert DeCady
*Assistant Examiner*—Steven R Garland
(74) *Attorney, Agent, or Firm*—Brian M. Dingman; Kathryn V. Chelini; Mirick, O'Connell, DeMallie & Lougee, LLP

(57) ABSTRACT

Systems and methods for calculating and predicting performance characteristics, incremental heat rate, capacity, incremental costs, production cost and emissions, for electric power generation plants, and in particular, those that use steam and gas-turbine prime movers. The system includes models and modules for calculating current unit performance and predicting unit performance, including the incremental heat rate and maximum capacity, using unit operating parameters, unit configuration data, and fuel constituency data. The system further includes a module for forecasting or predicting unit performance and cost information, by allowing the user to alter unit configuration and fuel constituency data to model planned maintenance and projected fuel changes, and to account for anticipated atmospheric conditions.

18 Claims, 5 Drawing Sheets

U.S. PATENT DOCUMENTS

| | | |
|---|---|---|
| 6,792,759 B2 | 9/2004 | Rollins, III |
| 6,819,097 B2 | 11/2004 | Chen |
| 6,879,884 B2 | 4/2005 | Miyashita et al. |
| 7,085,660 B2 * | 8/2006 | Mansingh et al. ............. 702/60 |
| 7,131,259 B2 | 11/2006 | Rollins, III |
| 2006/0089730 A1 | 4/2006 | Rosenof et al. |

OTHER PUBLICATIONS

Kona, et al. "Plant Monitoring Workstation With Online Determination of Incremental Heat Rate" Computer Applications In Power vol. 3, Issue 4, Oct. 1990, pp. 21-24.*

Shimko, et al. "An Overview of Madison Gas & Electric's Energy Management System", IEEE 1993, pp. 98-104.*

* cited by examiner

SYSTEMS AND METHODS FOR CALCULATING AND PREDICTING NEAR TERM PRODUCTION COST, INCREMENTAL HEAT RATE, CAPACITY AND EMISSIONS OF ELECTRIC GENERATION POWER PLANTS BASED ON CURRENT OPERATING AND, OPTIONALLY, ATMOSPHERIC CONDITIONS

CROSS REFERENCE TO RELATED APPLICATION

This application is based upon and claims the benefit of priority from U.S. provisional application No. 60/831,389 filed Jul. 17, 2006, the entire contents of which are incorporated by reference herein.

FIELD OF THE INVENTION

This invention relates generally to the field of electric power generation. More specifically, this invention relates to systems and methods for calculating and predicting performance characteristics, incremental heat rate, capacity, incremental costs, production cost and emissions, for electric power generation plants, and in particular, those that use steam and gas-turbine prime movers. The invention may have further applications in the fields of electric system generation economic dispatch; generating unit equipment sizing, specification and procurement; operational costing; generation and capacity trading; and emissions accounting and trading.

BACKGROUND OF THE INVENTION

Incremental costing is the basis for dispatch of multiple generating units in electric power generation systems. The incremental cost is the product of the incremental heat rate (IHR) and fuel cost. Some companies also include incremental maintenance, and other operating costs that are directly attributable to production, in the incremental cost calculation. To optimize economies, all generating units supplying a common load should operate at the same incremental cost, as shown in FIG. 1. As is known in the art, FIG. 1 plots Incremental Cost, in dollars per megawatt-hour ($/MWhr), against Unit Output, in megawatts (MW), for two discrete units, Unit A and Unit B. Specifically, FIG. 1 shows the unit loading required to deliver 807 MW from the two-unit system, where the incremental cost, or lambda ($\lambda$), is 30.41 $/MWhr. As system load changes, the incremental cost, or system lambda, increases or decreases until the sum of the unit loads matches the system load demand. Each unit is also constrained by its minimum stable load and maximum capacity.

In the industry, incremental heat rate curves are usually developed from periodic performance tests. As is known in the art, an Input/Output (I/O) curve, shown in FIG. 2, represents the total heat input to a power generating unit as a function of the gross output (the total power generated by the unit) or net output (gross output less the power used by the unit's pumps, fans and other internal equipment). FIG. 2 shows Heat Input, in BTU/hour, vs. Unit Output, in megawatts, and further shows the minimum and maximum capacity of Unit A and Unit B. These data are fit to a polynomial curve, typically of the third to sixth order, which commonly has a defined constraint of being monotonically increasing within the unit's operating range or minimum to maximum capacity. As is known in the art, the unit heat rate, shown in FIG. 3, is heat input divided by unit output, and represents the unit's overall performance. Incremental heat rate is the first mathematical derivative of the I/O curve, or $d(I/O)/d(MW)$.

All three curves—input/output, heat rate and incremental heat rate—can be presented as gross or net, depending on the operating and dispatch philosophies of the company.

Performance tests are usually run under carefully controlled conditions to form a baseline or nominal Input/Output curve. The most common controlled conditions are main steam pressure, main steam temperature and hot reheat temperature. Other parameters may not be controllable, but are corrected in the unit performance calculations to standard conditions, typically design or achievable values for the generating unit. Such parameters include steam reheater pressure drop, condenser pressure or circulating water temperature, ambient air temperature and barometric pressure. Valve lineups or generating unit configuration can also change either for operating load or for maintenance. Fuel makeup, or ultimate analysis, is important, but usually not an adjustment factor in the calculations.

Currently, in the industry, the performance curves are updated only occasionally, perhaps annually, but often less frequently. However, between the updates, variations in any of the baseline conditions or lineups may cause changes in the unit's performance and capacity. When adjustments are made to unit performance for these variations, the adjustment typically amounts to the application of a few standard correction curves, or factors from these curves, which are typically supplied by the equipment vendors for design operation of a new unit. Considering the normal variations in steam temperatures and pressures, several or many operating parameters can be off-nominal at any moment, so the IHR can regularly be 1-5% in error, resulting in 0.5 to 2% inefficiency in the overall system dispatch.

Therefore, there is a need in the art for methods and systems for calculating and predicting performance in near real-time, to optimize generation costing. In addition, as public concern about emissions, and the resulting legislation, continue to evolve, there is also a need in the art to track and predict emissions from generating units and to quantify their production rates and cumulative quantities.

SUMMARY OF THE INVENTION

The present invention provides methods and systems for calculating and predicting performance characteristics, incremental heat rate, capacity, incremental costs, production cost and emissions rates and quantities, for electric power generation plants, and in particular, those that use steam and gas-turbine prime movers.

In a preferred embodiment, the present invention provides systems and methods for integrated electric generating unit performance monitoring and analysis. The invention provides near real time input/output, unit heat rate, incremental heat rate, unit maximum capacity, incremental costs and emissions rates and quantities based on up-to-the-moment unit lineup and configuration information, fuel analysis or constituency, and atmospheric conditions. In a preferred embodiment, results generated by the present invention reflect near real time actual performance for improved decision support, dispatch, and emissions accounting. As described above, in the industry, dispatchers typically use standardized performance curves that frequently do not agree with current conditions, thus introducing error to the dispatch. As such, by using the present invention, unit performance does not require correction to standard conditions.

In the preferred embodiment, the present invention also includes a forecasting module that accepts: (i) forecasts of weather or atmospheric conditions, such as air temperature, barometric pressure, and cooling water temperature; (ii) unit lineup or configuration; (iii) fuel constituency or analysis; and (iv) additional performance parameters of special note for the forecast period. The present invention calculates the input/output, unit heat rate, incremental heat rate over the unit's entire load range (i.e., incremental heat rate curve), maximum capacity, incremental costs and emissions rates and quantities for each interval in the forecast period.

As described in detail below, the present invention features systems and methods for calculating and predicting near term production cost, capacity, incremental heat rate, incremental costs and emissions rates and quantities of electric generating power plants based on current operating conditions, comprising models and modules that perform the following functions:

(1) Calculate, periodically or on demand, generating-unit equipment performance data using: (i) current plant lineups and unit configuration; (ii) measured, and preferably recorded, physical operating data such as flow, pressure and temperature; (iii) and fuel constituency or composition; to synthesize the performance of individual equipment into overall unit performance. In a preferred embodiment, the present invention may duplicate actual performance to within a statistical error band of approximately 0.25% of measured, and preferably recorded, unit data as required of the base heat balance program;

(2) Characterize, periodically or on demand, unit performance for specified time periods based on the calculated equipment and unit performance data from (1), above;

(3) Calculate, periodically or on demand, critical parameters for economical loading and operation of the generating unit and the total electric system, and monitor equipment in near-real time using additional support modules that:

(a) calculate, periodically or on demand, near real time incremental heat rate as the slope of heat energy input vs. current load by assessing overall unit performance at an offset of approximately 2-5% above and approximately 2-5% below the recorded load for each time period, the final amount of offset determined by engineering analysis of the input data. Unit performance is based on the characterized model from (2), above. The load offset is anticipated to be approximately 2-5% of current load, although the exact amount of shift is determined by careful evaluation of plant instrumentation, operation and stability.

(b) predict, periodically or on demand, the unit's maximum capacity based on the data from the performance characterization model from (2), above, by increasing steam or gas flow to the turbine until a physical limit is achieved in the model. For example, physical limits may occur at feedwater pump capacity, at fan capacity, when the turbine throttle valves are wide open, when the turbine exhaust flow reaches critical velocity, when regulated emissions restrictions are reached, or upon the occurrence of other operating limitations that the unit operator may identify;

(4) Forecast, periodically or on demand, unit production costs, capacity, incremental costs, emissions and incremental heat rate over the unit's entire load range (i.e., incremental heat rate curve), for a forward period of time, preferably one to seven days, based on expected operator-specified plant lineups and configuration, operational limitations, fuel composition and weather forecasts for the forward period of time; and (5) Calculate, periodically or on demand, expected emissions, including but not limited to, nitrogen oxides (NOx), sulfur oxides (SOx) and carbon dioxide ($CO_2$), for the current time period, and integrate totals by day, month, year and cumulative total and by geographic emissions region.

A block diagram of the process and information flow of a preferred embodiment of the invention is shown in FIG. 4.

BRIEF DESCRIPTION OF THE DRAWINGS

Other objects, features and advantages will occur to those skilled in the art from the following description of the preferred embodiments and the accompanying drawings, in which.

DESCRIPTION OF PREFERRED EMBODIMENTS

The present invention provides methods and systems for calculating and predicting performance characteristics, incremental heat rate, capacity, incremental costs, production cost and emissions rates and quantities for electric power generation plants, and in particular, those that use steam and gas-turbine prime movers.

In a preferred embodiment, the invention utilizes a commercial off-the-shelf (COTS) heat balance calculation program to develop integrated software models or simulations of the power plant. The preferred COTS heat balance calculation program is Syntha® 2000, provided by Syntha® Corporation, although other COTS heat balance calculation programs may be used with the present invention, including but not limited to PEPSE, provided by Scientech, and GateCycle, provided by GE Energy. The invention, however, is not limited to using a COTS heat balance calculation program, and other programs, whether proprietary, in-house, or resulting from government research or funding, are contemplated and within the scope of the invention.

In addition, in a preferred embodiment of the invention, a database/archival program is used to record and store the data generated by the current computer models and modules and the plant performance measurements used as inputs into the systems and methods of the invention. In a preferred embodiment, PI by OSIsoft®. is used as the database/archival program, although other systems available from plant control instrumentation vendors and other sources may be used with the present invention, including but not limited to proprietary or in-house systems and sources, or systems and sources resulting from government research or funding.

Figure 1:
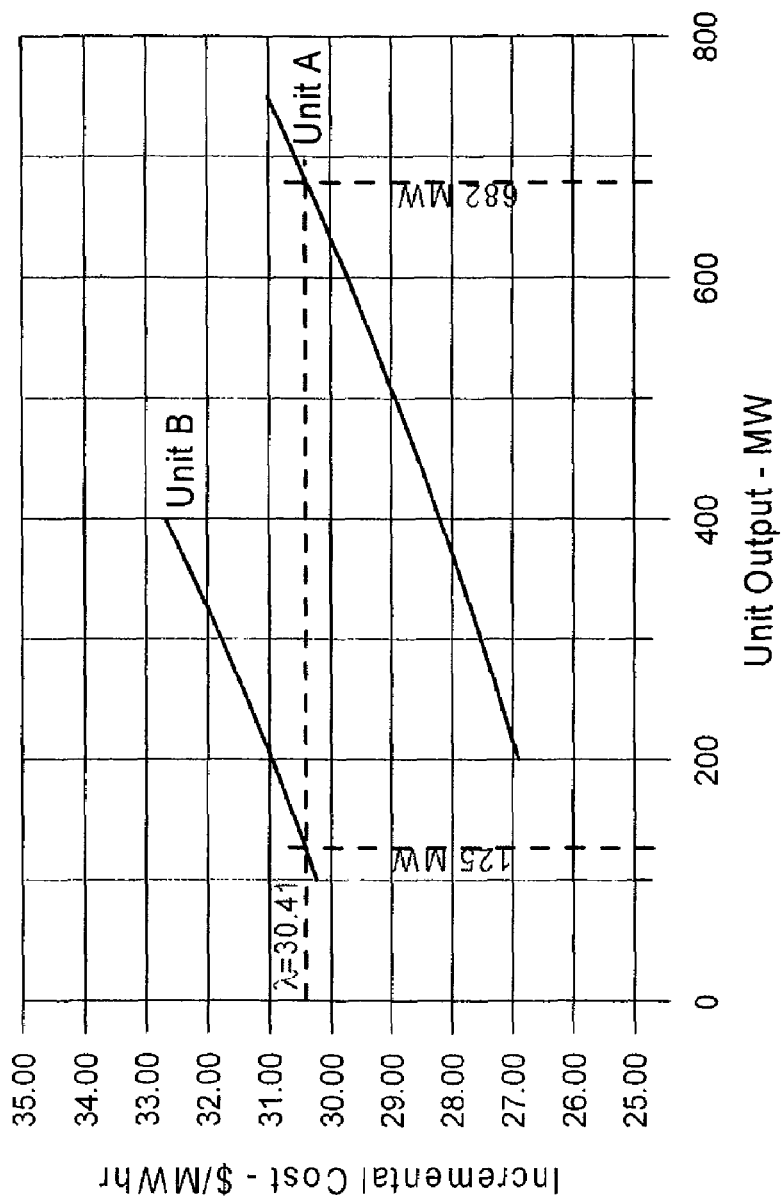
FIG. 1 is a prior art plot of Incremental Cost, in dollars per megawatt-hour, against Unit Output, in megawatts, for two discrete units, Unit A and Unit B, specifically showing the unit loading required to deliver 807 MW from the two-unit system.
Figure 3:
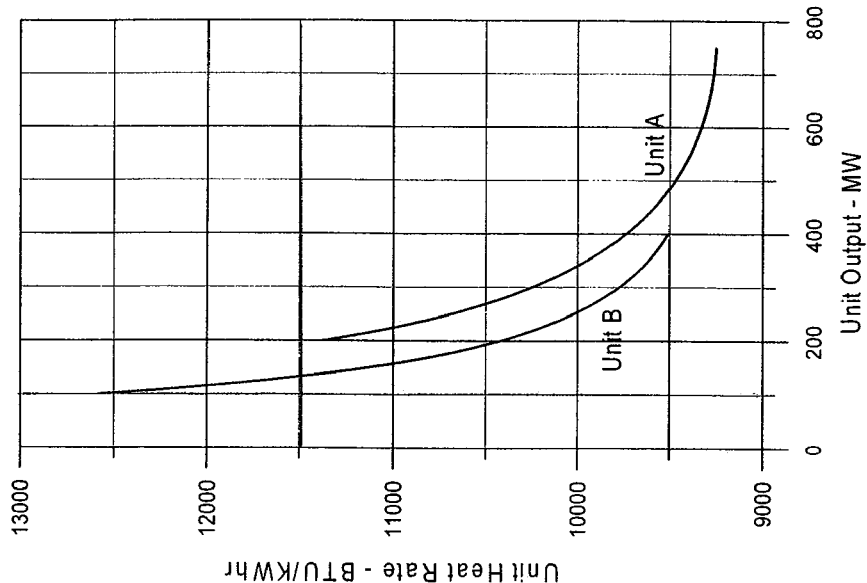
FIG. 3 is a prior art Unit Heat Rate curve, showing Unit Heat Rate, in BTU/kilowatt-hour, vs. Unit Output, in megawatts, for each of the two units shown in FIG. 1.
Figure 2:
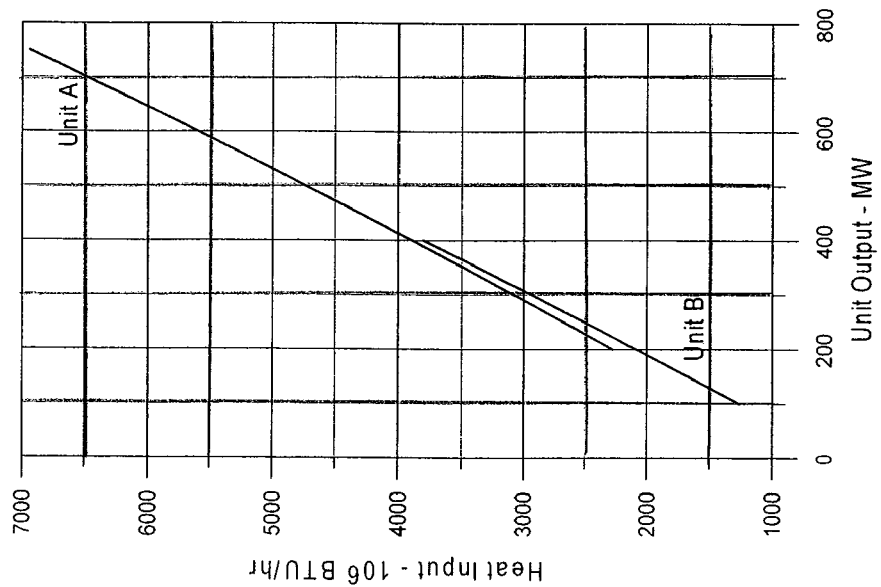
FIG. 2 is a prior art Input/Output curve for Unit A and Unit B, showing Heat Input, in BTU/hour vs. Unit Output, in megawatts, and further showing the minimum and maximum capacity of each of the units shown in FIG. 1.
Figure 4:
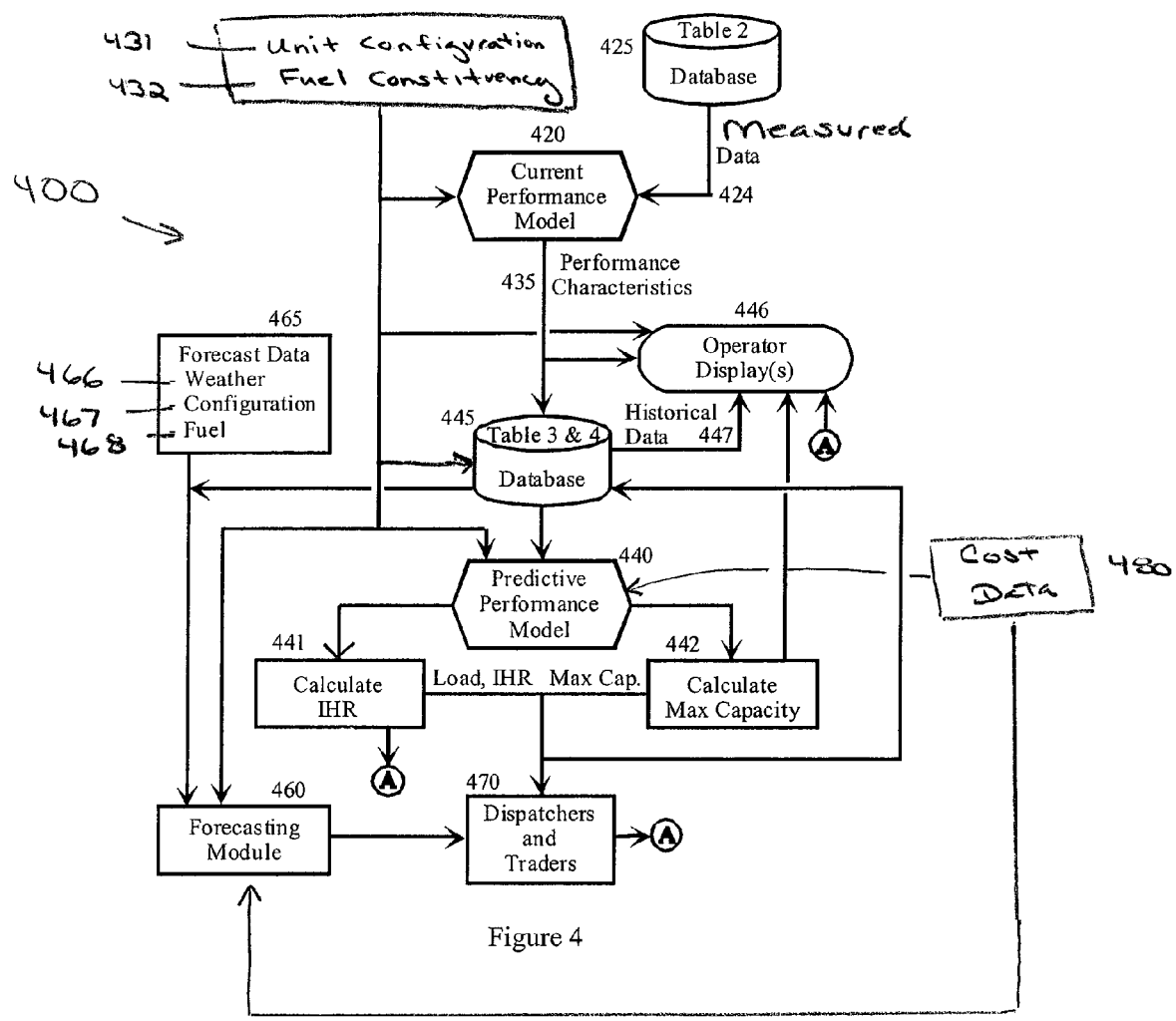
FIG. 4 is a block diagram of a preferred embodiment of a method and system for calculating and predicting performance characteristics, incremental heat rate, capacity, incremental costs, production cost and emissions rates and quantities for electric power generation plants, in accordance with the present invention.

A block diagram of a preferred embodiment of the invention is shown in FIG. 4, in which Calculation and Prediction System 400 comprises computer models and modules used to calculate current unit performance, including but not limited to production cost, incremental heat rate, maximum unit capacity and emissions production. Preferably, models and modules are derived from a single, custom, plant-specific model to make as much use of archived unit data as possible. For example, in the preferred embodiment, two separate Syntha® 2000 models are used, and are run at seven to ten loads or capacities to achieve the standard results. An additional six to nine loads are run if the forecasting model is implemented.

In a preferred embodiment, Calculation and Prediction System 400 comprises the following component models and modules: Current Performance Model 420, Predictive Performance Model 440, and Forecasting Module 460. These three models/modules are summarized in Table 1, and discussed in detail below.

intervals, customized to the specific installation, are contemplated and within the scope of the invention.

Preferably, Current Performance Model 420 also accepts as input Unit Configuration Data 431 and Fuel Constituency Data 432. Unit Configuration Data 431 describes the unit's current physical configuration, such as the number of heaters that are out of service, and the number of circulating water or feedwater pumps in service. Fuel Constituency Data 432 describes properties of the fuel, including, but not limited to, the amount and breakdown of hydrocarbons, the elemental chemical makeup, the amount of water, and the heating value.

TABLE 1

Models and Modules Incorporated in a Preferred Embodiment of the Invention

| Model/Module | Application | Data Specified: | Model/Module Calculates: |
|---|---|---|---|
| Current Performance | Current Unit Performance calculation | Physical measurements describing the unit's current operating parameters (recorded, user-entered, or real time) Configuration data describing the unit's current physical configuration Current fuel constituency or composition | Equipment performance characteristics Fuel quantity Emissions, including emissions rates and cumulative emissions All of the above are based on current unit configuration; recorded, user-entered, or real-time physical measurements; & current fuel constituency |
| Predictive Performance | Incremental Heat Rate - Energy Trading Unit Dispatch Maximum Capacity - Energy Trading Unit Dispatch | Equipment performance characteristics from Current Performance Model above Configuration data describing the unit's current physical configuration Current fuel constituency or composition Current cost data | Incremental heat rate (IHR) at the current load, based on current unit configuration, recorded, user-entered, or real time physical measurements; & current fuel constituency Maximum capacity of unit based on current unit configuration; recorded, user-entered, or real time physical measurements; & current fuel constituency Incremental cost |
| Forecasting | Expected IHR and Capacity for future period - Energy Trading Unit Dispatch | Equipment performance characteristics from Current Performance Model above Configuration data describing the unit's physical configuration (anticipated or current) Fuel constituency or composition (anticipated or current) Cost data (anticipated or current) Weather data, including ambient temperatures and barometric pressure describing atmospheric conditions (anticipated or current) | Incremental heat rate (IHR) over the unit's entire load range Maximum capacity Fuel quantity Emissions, including emissions rates and cumulative emissions Incremental cost Production cost/Total Operating cost |

Current Performance Model 420

With further reference to FIG. 4, in a preferred embodiment, Current Performance Model 420 calculates a full mass and energy balance using a COTS heat balance calculation program, such as Syntha® 2000. Current Performance Model 420 obtains Measured Data 424 from Measured Data Database 425 for the most recent time interval. Measured Data 424 are physical data that represent a unit's operating parameters, such as flow, temperature, and pressure. In a preferred embodiment, Measured Data 424 is historical data that has been recorded, although in alternate embodiments, user-entered or real time data may be used in addition to or instead of, recorded data. In addition, in alternate embodiments, Measured Data 424 may also include data calculated or derived from physical measurements. In a preferred embodiment, the most recent time interval is between approximately five minutes and approximately fifteen minutes, although other time Both Unit Configuration Data 431 and Fuel Constituency Data 432 may be stored in Measured Data Database 425 and/or manually input by a user or received from an external source.

Table 2 provides a list of typical Measured Data 424 that may be used as input to Current Performance Model 420, although the specific data parameters used may vary by unit types, configuration and age. Further, Measured Data 424 is not limited to the data parameters listed in Table 2, and additional data parameters are contemplated and within the scope of the invention in a format and manner specific to the selected database/archival program, and may require custom extraction for each site installation to provide the input data for any particular embodiment.

Table 2 lists typical input data parameters for four unit types (Fossil Fuel Unit, Nuclear Unit, Gas Turbine, and Combined Cycle). The use of a "Y" in a particular column in Table 2 indicates that the data parameter is relevant to the associated unit type. For example, a "Barometric Pressure" data parameter is relevant to Fossil Fuel Units, Gas Turbines, and Combined Cycles, but not to Nuclear Units. Note that Current Performance Model 420 performs calculations for each unit type independently. In other words, the calculations performed for a Fossil Fuel Unit are different in at least some respects to the calculations performed for a Nuclear Unit.

The number of data parameters used by Current Performance Model 420 depends in part upon Unit Configuration data. For example, as is known in the art, units usually have three to eight feedwater heaters, and may have two or three parallel paths or trains for these heaters. If a particular unit has three heater trains, and each train has 8 heaters, there are 24 heaters. If each heater has an associated data parameter for temperature, there will be 24 different temperature data parameters used as input to Current Performance Model 420. Typically, a simple generating unit may have as few as ten to twenty data parameter inputs to Current Performance Model 420, while a large, complex unit may have more than 125 input data parameters. The exact number of input data parameters depends on the database structure, the generating unit configuration, the available unit instrumentation, and the complexity and structure of the model.

With further reference to FIG. 4, in a preferred embodiment, Current Performance Model 420 calculates Performance Characteristics 435 from three sources: (i) Measured Data 424; (ii) Unit Configuration Data 431; and (iii) Fuel Constituency Data 432, From these multiple data sources, Current Performance Model 420 calculates Performance Characteristics 435, which indicate how the unit performed during the specified time interval. The calculations used by Current Performance Model 420 are standard engineering calculations that are well known to those skilled in the art, and may be derived by considering the desired inputs and outputs to Current Performance Model 420. In a preferred embodiment of the invention, Performance Characteristics 435 generated by Current Performance Model 420 are stored in Performance Characteristics Database 445. In a preferred embodiment, Measured Data 424 and Performance Characteristics 435 are co-located in the same database, and Performance Characteristics Database 445 and Measured Data Database 425 are the same physical database. Note also that Unit Configuration Data 431 and Fuel Constituency Data 432 may also be stored in Performance Characteristics Database 445.

Table 3 displays a typical list of Performance Characteristics 435, which may include such information as turbine efficiency and flow factors, heat exchanger heat transfer coefficients, pump and fan efficiency, and piping pressure coefficients, although the invention is not limited to this list, and other performance measurements may be included as required by the particular application. The specific performance characteristics that are calculated by Current Performance Model 420 and recorded in Performance Characteristics Database 445 depend on the unit's design and the needs and objectives of the unit's operators. These data can be compared with the same values from Predictive Performance Model 440 to assist in monitoring the unit's operation.

With further reference to FIG. 4, in a preferred embodiment, the present invention may include a user interface, which may contain one or more Operator Displays 446. Operator Displays 446 may be used to view Unit Configuration Data 431, Fuel Constituency Data 432, Measured Data 424, Performance Characteristics 435, and Historical Data 447, including but not limited to current generating unit configuration and fuel constituency, maximum capacity, incremental heat rate, emissions quantities and other input data and results that may be required by the end user. Historical Data 447 are any data recorded to the database from previous input periods or invention calculations.

Figure 5A:
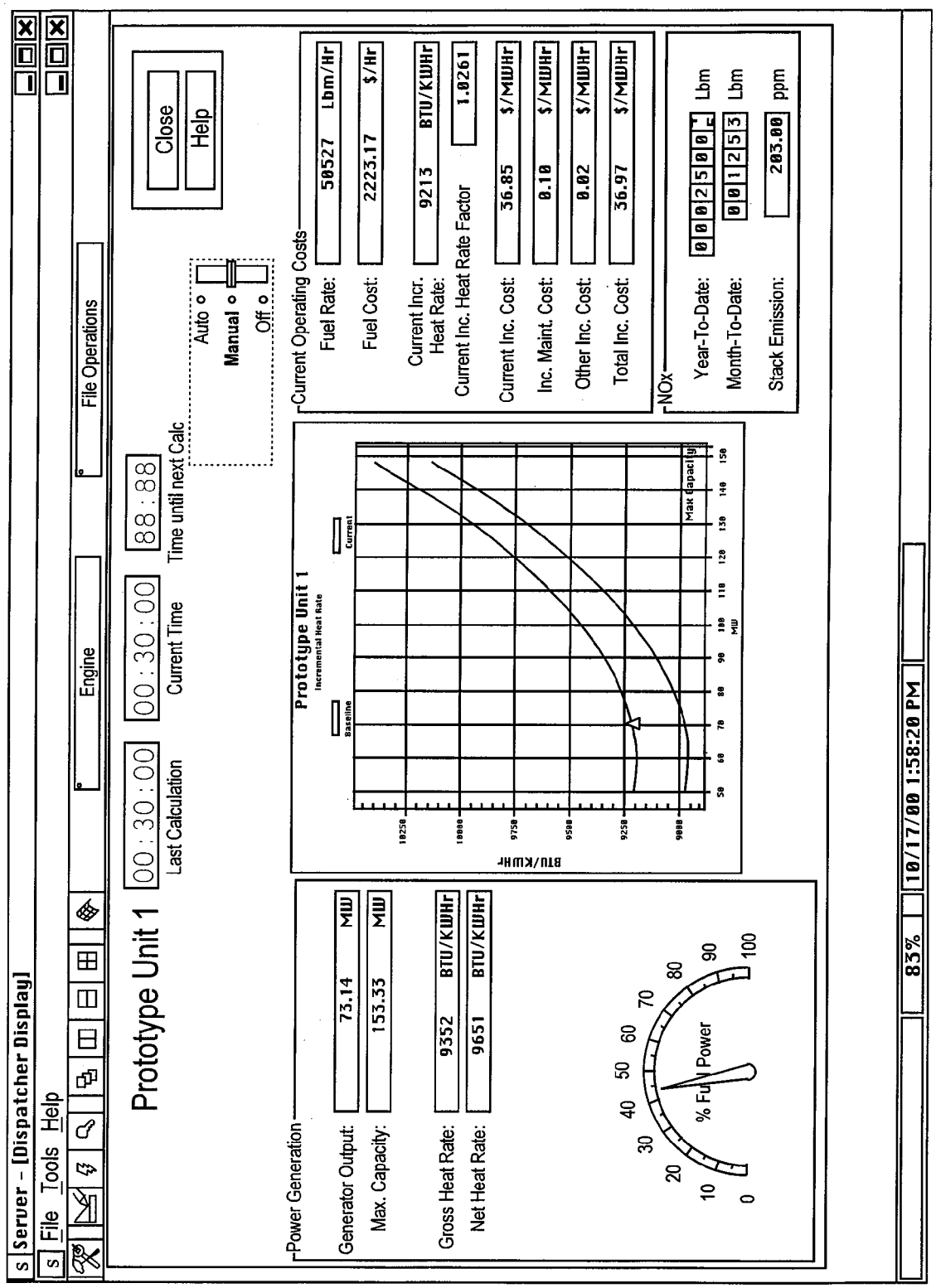
FIGS. 5a and 5b are sample operator displays for the method and system of FIG. 4.
Figure 5B:
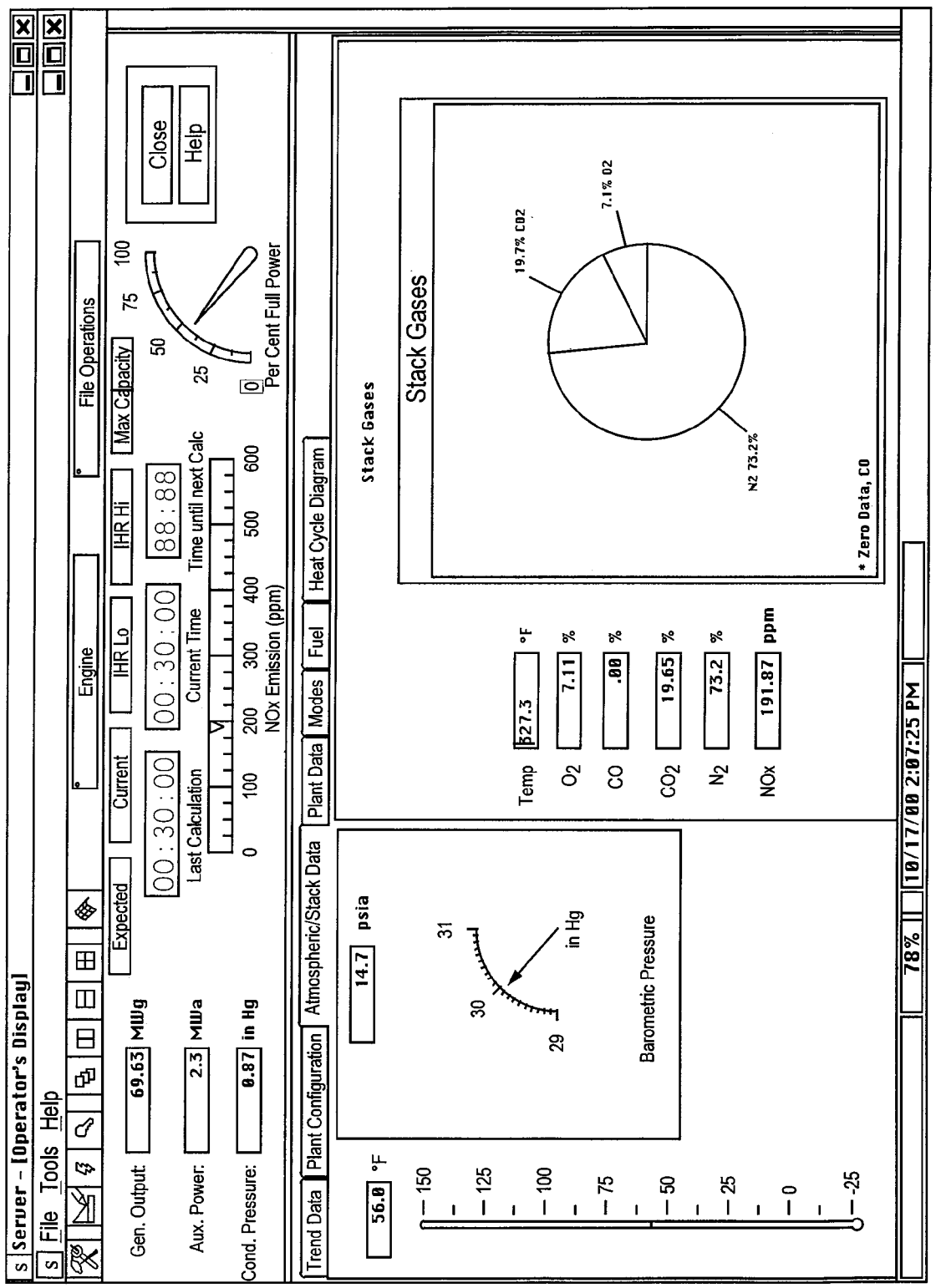

The format and layout of Operator Displays 446 may be customized to the installation and depend on user needs and preferences. Two non-limiting example displays are shown in FIGS. 5a and 5b. In alternate embodiments, the user interface may also include Trader and Dispatcher displays. In addition, in alternate embodiments, the present invention may include a reporting module, to provide pre-configured and user-defined reports.

TABLE 2

Typical Input Measured Data for Current Performance Model

| Data Parameter | Fossil Unit | Nuclear Unit | Gas Turbine | Combined Cycle |
|---|---|---|---|---|
| Gross Generation | Y | Y | Y | Y |
| Barometric Pressure | Y | | Y | Y |
| Air Temperature | Y | | Y | Y |
| Humidity/Wet Bulb Temp | Y | | Y | Y |
| Fuel Constituency | Y | | Y | Y |
| Stack Gas Temperature | Y | | Y | Y |
| Main Steam Flow | Y | Y | | Y |
| Main Steam Pressure | Y | Y | | Y |
| Main Steam Temperature | Y | Y | | Y |
| Cold Reheat Pressure | Y | Y | | Y |
| Cold Reheat Temperature | Y | Y | | Y |
| Hot Reheat Pressure | Y | Y | | Y |
| Hot Reheat Temperature | Y | Y | | Y |
| Crossover Pressure | Y | | | Y |
| Crossover Temperature | Y | | | Y |
| Condenser Pressure | Y | Y | | Y |
| Circ Water Temperature in | Y | Y | | Y |
| Circ Water Temperature out | Y | Y | | Y |
| FWH Exit Temperatures | Y | Y | | Y |
| FWH Drain Temperatures | Y | Y | | Y |
| Extraction Temps @ Turbine | Y | Y | | Y |
| Extraction Temps @ FWH | Y | Y | | Y |
| FP Suction Pressure | Y | Y | | Y |
| FP Suction Temperature | Y | Y | | Y |
| FP Discharge Pressure | Y | Y | | Y |
| FP Discharge Temperature | Y | Y | | Y |
| Fan Discharge Pressure | Y | | | |
| Fan Discharge Temperature | Y | | | |
| Compressor Exit Pressure | | | Y | Y |
| Combustion Can Temperature | | | Y | Y |

In a preferred embodiment, operating data, performance characteristics and other routine data as listed in Table 2 that are used as inputs to the different models change periodically and are input directly by the invention. In contrast, simulated physical arrangements in the Current Performance Model 420, Predictive Performance Model 440, and Forecasting Module 460 can be changed only by an administrator when warranted by physical unit changes and/or data input requirements of the unit. Examples of warranted changes include new equipment or plugged tubes in a heat exchanger, or permanent or long-term generating unit reconfiguration. Such updates apply to all models—Current Performance Model 420, Predictive Performance Model 440, and Forecasting Module 460.

TABLE 3

Typical Data Stored to the Database from the Models/Modules

| Data Stored | Current Performance Model | Predicted Performance Model | IHR Model | Maximum Capacity Model |
|---|---|---|---|---|
| Parallel Data with Current Performance Model Input | | Y | | |
| Steam/Air Flow | Y | Y | Y | Y |
| Gross (or Net) Output | Y | Y | Y | Y |
| Turbine TFR, Flow Factors and Efficiency | Y | Y | | |
| Heat Exchanger dP and Heat Transfer Coefficients | Y | Y | | |
| Piping dP Coefficients | Y | Y | | |
| Pump Efficiency and Head | Y | Y | | |
| Fan/Compressor Efficiency and Pressure Ratio | Y | Y | | |
| Steam Generator Efficiency | Y | Y | | |
| Ambient Conditions | Y | Y | Y | Y |
| Equipment In/Out of Service | Y | Y | Y | Y |
| Fuel Constituency | Y | Y | Y | Y |

Predictive Performance Model 440

With further reference to FIG. 4, Calculation and Prediction System 400 further comprises Predictive Performance Model 440, which extends the function of Current Performance Model 420 to develop the unit's near real time heat rate and production cost, incremental heat rate (IHR), current maximum capacity, production and incremental costs, and emissions quantities. Dispatchers and traders, which may include independent system operators (ISOs), regional power pools, generating companies, and public sector institutions, need this information to economically load units in the power system, and to optimally broker power (MW) and energy (MWhr). In addition, unit and plant operators need this information to evaluate maintenance plans and schedules, determine optimum unit operation and assess capital improvements or modifications. In a preferred embodiment, the invention provides engineering data to support dispatcher and operator decisions.

Predictive Performance Model 440 utilizes a first model, Calculate Incremental Heat Rate Model 441, run at two loads to calculate the incremental heat rate, and a second model, Calculate Maximum Capacity Model 442, to determine the unit's maximum capacity. Both models utilize Performance Characteristics 435 from Current Performance Model 420 to characterize the unit's performance for the specified time interval. Table 4 lists typical data types generated by Current Performance Model 420 and used by Predictive Performance Model 440, Calculate Incremental Heat Rate Model 441, and Calculate Maximum Capacity Model 442. The actual list of data types is not limited to Table 4, and may include other data types. The types of data may vary from unit to unit, and may depend on a number of parameters, including but not limited to the type of unit (fossil, nuclear, gas turbine, etc.) and the needs and objectives of the unit operator.

TABLE 4

Typical Data Generated by Current Performance Model and Used by Predictive Performance Model

| Data Parameter | Fossil Unit | Nuclear Unit | Gas Turbine | Combined Cycle |
|---|---|---|---|---|
| Turbine Flow Factors | Y | Y | Y | Y |
| Turbine Efficiency | Y | Y | Y | Y |
| Heat Exchanger Heat Transfer Coefficients | Y | Y | | Y |
| Piping dP Coefficients | Y | Y | | Y |
| Pump Efficiency and Head | Y | Y | | Y |
| Fan/Compressor Efficiency and Pressure Ratio | Y | Y | Y | Y |
| Steam Generator Efficiency | Y | | | Y |
| Ambient Conditions | Y | Y | Y | Y |

Calculate Incremental Heat Rate Model 441

Calculate Incremental Heat Rate Model 441 determines an increment heat rate at a specified load. Incremental heat rate (IHR) is defined as the slope of the Input/Output curve (heat input vs. power output). With further reference to FIG. 4, in a preferred embodiment, Calculate Incremental Heat Rate Model 441 very closely approximates the slope of the Input/Output curve by using a predictive model to calculate heat input and power output at an offset of approximately 2-5% above and approximately 2-5% below the recorded load for each time period, the final amount of offset determined by engineering analysis of the input data. Calculate Incremental Heat Rate Model 441 determines the slope, and thus the incremental heat rate, between these two points. This calculation reflects the current IHR with current unit configuration and fuel, current ambient conditions and current equipment performance and status from Measured Data Database 425 and Performance Characteristics Database 445. Cost Data 480, which may include fuel costs, consumable costs (such as reagents and sorbents), maintenance costs, plant depreciation costs, emissions penalties or allowance costs and additional unit or plant-specific special costs or factors, may then be applied to establish the predicted incremental and total operating cost for the unit under the given operating conditions.

The amount of load offset from the current load is estimated not to exceed approximately plus and minus 5%, and will be as close to approximately 2% as practical after an engineering analysis using common statistical, calculus and instrument calibration practices. The analysis considers the stability, accuracy and precision of a unit's instrumentation, archival data and the unit operators' objectives, which may include using data generated by any of the models and modules of the invention for any or all of performance monitoring, economic dispatch, power trading and/or emissions trading.

Calculate Maximum Capacity Model 442

An important datum for dispatchers and traders is the unit's maximum capacity. This value determines how much more power the unit can produce under the current operating conditions, thus how much power is available to deliver or sell on the open market. As shown in FIG. 4, Calculate Maximum Capacity Model 442, a predictive model, uses the maximum values of the steam flow for steam systems, the air flow for gas systems or both, for combined systems, as a starting point to determine the current maximum capacity. Results from this initial execution of Calculate Maximum Capacity Model 442 are compared to a user-specified table of equipment limitations, including but not limited to pump flow capacity, allowable piping pressure losses, and boiler maximum steam flow rate, to establish that none of these user-specified limits are exceeded. If one of the user-specified limits is exceeded, then that limit becomes the input datum for the next execution of Calculate Maximum Capacity Model 442. This process is repeated until no other user-specified limits are exceeded.

The calculations used by Calculate Maximum Capacity Model 442 are standard engineering calculations well known to those skilled in the art, and may be derived by considering the desired inputs and outputs to Calculate Maximum Capacity Model 442. In a preferred embodiment, Calculate Maximum Capacity Model 442 uses a heat balance program that incorporates the Second Law of Thermodynamics. For example, in the case of a steam turbine, and with Syntha® 2000 as the calculation engine, the turbine's throttle flow ratio is set at exactly 1.0 (Valves-Wide-Open) to demand the maximum steam flow (100%) to the steam turbine. As is known in the art, other parameters may also affect maximum capacity, and may be taken into account to determine the limiting factor for output.

With further reference to FIG. 4, incremental heat rate and maximum unit capacity may be stored in Database 445 and are provided to Dispatchers and Traders 470 as requested, and may also be displayed on Operator Displays 446.

Forecasting Module 460

Generating companies need to bid into the power market, offering pricing and power for the next day or predict capacity to achieve expected customer demands. One power pool in the eastern United States, for example, requires bids from generating companies by 4 pm for the following day. Once the bids are received, the power pool selects the successful bidders, and commits them to their bids.

With further reference to FIG. 4, Forecasting Module 460 uses: (i) Performance Characteristics 435 provided by Current Performance Model 420; and (ii) Forecast Data 465 to predict production and incremental costs, capacity and emissions data, including but not limited to NOx, SOx, and $CO_2$ emissions, for the forecast time period. Forecast Data 465 includes three types of data: (i) Forecast Weather or Atmospheric Data 466; (ii) Forecast Unit Configuration Data 467; and (iii) Forecast Fuel Constituency Data 468.

Forecast Weather or Atmospheric Data 466 describes anticipated atmospheric conditions, and may include, but is not limited to, ambient air temperature, barometric pressure, and cooling water temperature, and may be input from a variety of sources, such as external links to weather forecast services or manual user input. Forecast Unit Configuration Data 467 represents the same types of information as the Unit Configuration Data 431 used as input to Current Performance Model 431. Here, however, an operator, dispatcher or trader may alter Forecast Unit Configuration Data 467 for the forecast time period to account for planned maintenance changes. Similarly, Forecast Fuel Constituency Data 468 represents the same types of information as Fuel Constituency Data 432, used as input to Current Performance Model 431. Again, though, an operator, dispatcher or trader may alter Forecast Fuel Constituency Data 468 for the forecast time period to account for planned fuel changes.

Forecasting Module 460 then uses Predictive Performance Model 440, and specifically Calculate Incremental Heat Rate Model 441 and Calculate Maximum Capacity Model 442 to calculate the equation for the incremental heat rate over the unit's entire load range (incremental heat rate curve) and the maximum capacity under the forecasted atmospheric conditions, unit configuration, and fuel constituency for the forecast time period. The projected incremental heat rate and maximum capacity are calculated in the manner described above for Calculate Incremental Heat Rate Model 441 and Calculate Maximum Capacity Model 442.

Forecasting Module 460 then retrieves and applies Cost Data 480 to the forecasted incremental heat rate and maximum capacity to determine the incremental cost (also known as marginal cost) and total operating cost for the unit during the forecast time period. As described above, Cost Data 480 may include fuel costs, maintenance costs, emissions limits or penalties costs and unit or plant-specific special costs or factors.

The calculations used by Forecasting Module 460 are standard engineering calculations that are well known to those skilled in the art, and may be derived by considering the desired inputs and outputs to Forecasting Module 460.

In alternate embodiments, the present invention may include additional models, including but not limited to an Expected Performance Model. An Expected Performance Model may accept one or more real time measurements in addition to recorded measurement data, to calculate a set of expected performance characteristics. These expected performance characteristics may then be compared to Performance Characteristics 435, and may be displayed, reported, and used as input to engineering and maintenance decisions.

In a preferred embodiment, Calculation and Prediction System 400 runs in a client-server computer network, where at least Current Performance Model 420, Predictive Performance Model 440, and Forecasting Module 460 run on a server computer, and the user interface, including Operator Displays 446, runs on a client computer. Client-server computer networks are well known in the art. In a preferred embodiment, one or more client computers connects to one or more server computers through a network, such as the Internet. The present invention is not limited to this configuration, however, and in alternative embodiments, Calculation and Prediction System 400 may run as a standalone application on a desktop or laptop computer, or across multiple computers connected via a local private network.

Although specific features of the invention are shown in some drawings and not others, this is for convenience only, as the features may be combined in other manners in accordance with the invention. Other embodiments will occur to those skilled in the art and are within the following claims.

What is claimed is:

1. A system for calculating an incremental heat rate and a maximum capacity for at least one power generating unit, comprising:

a current performance model, for performing a mass and energy balance for a power generating unit and calculating one or more performance characteristics for a first time period for the power generating unit, including at least a heat input value and an electrical output value, using at least one of data describing the unit's physical configuration, data describing the unit's operating parameters, and data describing the unit's fuel constituency;

a database, for storing at least one of the performance characteristics;

an incremental heat rate model, for calculating an incremental heat rate for the power generating unit for the first time period, using at least one of the performance characteristics, by determining a first point on an input/output curve by calculating a first heat input value at a first electrical output value, where the first electrical output value is less than the electrical output value for the first time period, determining a second point on the input/output curve by calculating a second heat input value at a second electrical output value, where the second electrical output value is greater than the electrical output value for the first time period, calculating a slope of a line connecting the first point and the second point on the input/output curve, where the slope of the line represents the incremental heat rate for the first time period; and a maximum capacity model, for performing an energy balance for the power generating unit and calculating a maximum capacity for the power generating unit for the first time period, using at least one of the performance characteristics.

2. The system of claim 1, further comprising a forecasting module, for calculating a forecast incremental heat rate and a forecast maximum capacity for a second time period for the power generating unit, using at least one of the performance characteristics and at least one of data describing an anticipated physical configuration of the unit, data describing an anticipated fuel constituency of the unit, and data describing anticipated atmospheric conditions.

3. The system of claim 2, further comprising a user interface, for displaying at least one of the incremental heat rate for the first time period, the maximum capacity for the first time period, the forecast incremental heat rate for the second time period, the forecast maximum capacity for the second time period, and the performance characteristics for the first time period.

4. The system of claim 1, where the energy balance incorporates the First and Second Laws of Thermodynamics.

5. The system of claim 1, where the first electrical output value is approximately 2 percent to 5 percent less than the electrical output value for the first time period, and the second electrical output value is approximately 2 percent to 5 percent greater than the electrical output value for the first time period.

6. The system of claim 1, where the first time period is a most recent time interval.

7. The system of claim 6, where the most recent time interval is between approximately five minutes and approximately fifteen minutes prior to the current time.

8. A method for calculating an incremental heat rate and a maximum capacity for at least one power generating unit, comprising:

performing a mass and energy balance for a power generating unit and calculating one or more performance characteristics for a first time period for the power generating unit, including at least a heat input value and an electrical output value, using at least one of data describing the unit's physical configuration, data describing the unit's operating parameters, and data describing the unit's fuel constituency;

storing at least one of the performance characteristics;

calculating an incremental heat rate for the power generating unit for the first time period, using at least one of the performance characteristics, by determining a first point on an input/output curve by calculating a first heat input value at a first electrical output value, where the first electrical output value is less than the electrical output value for the first time period, determining a second point on the input/output curve by calculating a second heat input value at a second electrical output valve, where the second electrical output value is greater than the electrical output value for the first time period, and calculating a slope of a line connecting the first point and the second point on the input/output curve, where the slope of the line represents the incremental heat rate for the first time period; and performing an energy balance for the power generating unit and calculating a maximum capacity for the power generating unit for the first time period, using at least one of the performance characteristics.

9. The method of claim 8, further comprising calculating a forecast incremental heat rate and a forecast maximum capacity for a second time period for the power generating unit, using at least one of the performance characteristics and at least one of data describing an anticipated physical configuration of the unit, data describing an anticipated fuel constituency of the unit, and data describing anticipated atmospheric conditions.

10. The method of claim 9, further comprising calculating a forecast incremental cost using the forecast incremental heat rate and at least one of data describing anticipated fuel costs, data describing anticipated consumable costs, data describing anticipated emissions costs, data describing anticipated plant depreciation costs, and data describing anticipated maintenance costs.

11. The method of claim 9, further comprising displaying at least one of the incremental heat rate for the first time period, the maximum capacity for the first time period, the forecast incremental heat rate for the second time period, the forecast maximum capacity for the second time period, and the performance characteristics for the first time period.

12. The method of claim 8, further comprising calculating an incremental cost for the first time period using the incremental heat rate for the first time period and at least one of data describing fuel costs, data describing consumable costs, data describing emissions costs, data describing plant depreciation costs, and data describing maintenance costs.

13. The method of claim 8, where the step of performing an energy balance incorporates the First and Second Law of Thermodynamics.

14. The method of claim 8, where the first electrical output value is approximately 2 percent to 5 percent less than the electrical output value for the first time period, and the second electrical output value is approximately 2 percent to 5 percent greater than the electrical output value for the first time period.

15. A method for calculating an incremental heat rate and a maximum capacity for at least one power generating unit, comprising:

performing a mass and energy balance for a power generating unit and calculating one or more performance characteristics for a first time period for the power generating unit, including at least a heat input value and an electrical output value, using at least one of data describing the unit's physical configuration, data describing the unit's operating parameters, and data describing the unit's fuel constituency;

storing at least one of the performance characteristics;

calculating an incremental heat rate for the power generating unit for the first time period, using at least one of the performance characteristics, by determining a first point on an input/output curve by calculating a first heat input value at a first electrical output value, where the first electrical output value is approximately 2 percent to 5 percent less than the electrical output value for the first time period, determining a second point on the input/output curve by calculating a second heat input value at a second electrical output value, where the second electrical output value is approximately 2 percent to 5 percent greater than the electrical output value for the first time period, and calculating a slope of a line connecting the first point and the second point on the input/output curve, where the slope of the line represents the incremental heat rate for the first time period; and performing an energy balance for the power generating unit, where the energy balance incorporates the First and Second Laws of Thermodynamics to determine a maximum capacity for the power generating unit for the first time period, using at least one of the performance characteristics.

16. The method of claim 15, further comprising calculating a forecast incremental heat rate and a forecast maximum capacity for a second time period for the power generating unit, using at least one of the performance characteristics for the first time period and at least one of data describing an anticipated physical configuration of the unit, data describing an anticipated fuel constituency of the unit, and data describing anticipated atmospheric conditions.

17. The method of claim 16, further comprising calculating a forecast incremental cost using the forecast incremental heat rate and at least one of data describing anticipated fuel costs, data describing anticipated consumable costs, data describing anticipated emissions costs, data describing anticipated plant depreciation costs, and data describing anticipated maintenance costs.

18. The method of claim 16, further comprising displaying at least one of the incremental heat rate for the first time period, the maximum capacity for the first time period, the forecast incremental heat rate for the second time period, the forecast maximum capacity for the second time period, and the performance characteristics for the first time period.

* * * * *